United States Patent [19]

Miley et al.

[11] Patent Number: 4,963,072
[45] Date of Patent: Oct. 16, 1990

[54] FEEDER FOR SHAPE UNSTABLE ARTICLES

[75] Inventors: Guy M. Miley, Lake Worth; Daniel J. McGuire, Fort Lauderdale, both of Fla.

[73] Assignee: Curt G. Joa, Inc., Boynton Beach, Fla.

[21] Appl. No.: 397,863

[22] Filed: Aug. 24, 1989

[51] Int. Cl.$^5$ .............................................. B65G 59/06
[52] U.S. Cl. ................................... 414/797.6; 221/36; 221/221; 414/795.8
[58] Field of Search ...................... 198/540, 543, 550.5, 198/550.9, 626, 627, 628; 414/795.6, 795.8, 797.6; 211/46, 61, 62, 285, 312 R, 221, 217, 36, 42; 193/2 R, 3, 33, 34, 38

[56] References Cited

U.S. PATENT DOCUMENTS

| | | | |
|---|---|---|---|
| 2,695,125 | 11/1954 | Bowen | 414/797.6 X |
| 3,376,969 | 4/1968 | Baker et al. | 198/628 X |
| 3,691,942 | 9/1972 | Wagley | 198/626 X |
| 3,825,192 | 7/1974 | Knight | 198/626 X |
| 4,050,467 | 9/1977 | Van Sluis et al. | 198/626 X |

Primary Examiner—Robert J. Spar
Assistant Examiner—Craig Slavin
Attorney, Agent, or Firm—Fuller, Ryan & Hohenfeldt

[57] ABSTRACT

A feeder for shape unstable articles such as pads for absorbing body fluids has an upright hopper having top and bottom openings for receiving and discharging pads. First and second rotationally driven upper pulleys having a plurality of round belt receiving grooves in their peripheries are mounted adjacent the bottom opening of the hopper on opposite sides of the vertical center line of the hopper. Third and fourth idler pulleys are arranged in laterally spaced apart relationship and symmetrical to the center line of the hopper at a lower level than the first and second pulleys. Because the lower pulleys are closer to each other than the upper pulleys, the belts converge toward each other such that articles which settle out of the hopper finally become wedged between the belts proximate to the lower pulleys. A stepping motor is energized to drive the pulleys and translate the belts so that the lowermost article in the stack is dispensed from between the lower pair of pulleys by reason of being frictionally engaged at its edges by the belts on the grooved pulleys. The stepping motor is started at the moment a pad should be dispensed and is stopped in response to the pad dropping across the beam of a photosensor so the feeder is self-timing. Thus, the feeder is self-adjusting for each individual article ranging from a short feed time for a compressed article to a longer feed time for the next article which may not be compressed and, hence, thicker.

6 Claims, 3 Drawing Sheets

FEEDER FOR SHAPE UNSTABLE ARTICLES

BACKGROUND OF THE INVENTION

This invention pertains to a machine for feeding single articles in a timed manner from a stack of articles which may be characterized as limp or floppy or shape unstable. Examples of such articles are sanitary napkins, diapers and other absorbent pads that are used on the body of incontinent adults.

In general machines which feed rigid or dimensionally stable products one-by-one from a hopper use suction cups or driven rollers for extracting an article. Products such as body exudant absorbent pads which are pliable and very porous cannot be segregated from the top of a stack of diapers nor from the bottom of a stack with suction cups. It is also not practical to push a pliable pad from the top or bottom of a stack with rollers without having the pad badly deformed in the process.

SUMMARY OF THE INVENTION

The new feeder for shape unstable articles includes a hopper in which a stack of articles is accumulated. The bottom of the hopper is open. The bottom articles in the stack emerge from the hopper but the articles do not fall freely because they enter a truncated v-shaped space whose sides or legs are defined by laterally spaced apart belt means which converge downwardly toward each other. By reason of the belt means becoming progressively closer to each other in the downward direction, the articles, particularly the article at the bottom of the stack, wedge between the belts. Means are provided for translating the belts in synchronism in the vertical direction intermittently. Each time the belts are translated momentarily, the lowermost article, being frictionally engaged by the belts, is discharged from between the belts. When the belts are stopped following discharge of one of the articles, the next succeeding article in the stack advances to the position of the one that was formerly lowermost and is ready for being fed out from between the belts.

The apparatus is distinguished by being self-timing. An activation signal is generated at the moment an article is to be discharged from between the belts. A stepping motor responds to the signal by turning on to translate the belts. Photosensor means detect the article as it is falling through a small distance to a conveyor for example. The stepping motor responds to discharge of the article being detected by turning off. Thus, discharge of only one article per activation signal is guaranteed for any reasonable frequency of activation signals. Moreover, the new mechanism has the ability to adjust the feed time for each individual article ranging from a short time for a compressed article to a longer feed for the next article which may be thicker and not compressed.

How the foregoing concept is implemented will now be described in greater detail in reference to the accompanying drawings.

DESCRIPTION OF A PREFERRED EMBODIMENT

Figure 1:
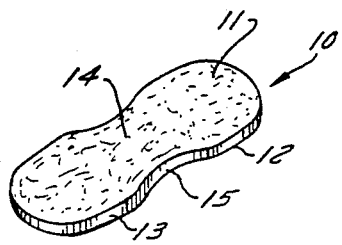
FIG. 1 is a plan view of a disposable diaper which exemplifies a shape unstable article or pad.

FIG. 1 is a diagrammatic view of a pad in the form of an adult diaper which is basically similar to an infant's diaper or sanitary pad. For convenience, the word "pad" will be used hereinafter as a generic designation for pliable articles, such as diapers, incontinence pads and sanitary pads. The pad, which is generally designated by the numeral 10 in FIG. 1, has one face covered with a sheet of nonwoven, porous material 11. This face of the pad interfaces with the crotch region of the body on which it is worn. The opposite surface of the pad is covered with a fluid impermeable sheet 12. The space between porous sheet 11 and impermeable sheet 12 is occupied by a material such as fluffed pulp fibers 13 or superabsorbent materials which absorb fluids that are discharged from the body and penetrate through the porous sheet 11. The edges of the porous and impermeable sheets 11 and 12 are sealed as is the case in diapers to prevent lateral discharge of fluids when the diapers are in use. The edges of the pads are contoured at its mid section marked 15 to create the narrow central region 14 for making the diaper type of pad fit better in the crotch region of the user.

Figure 3:
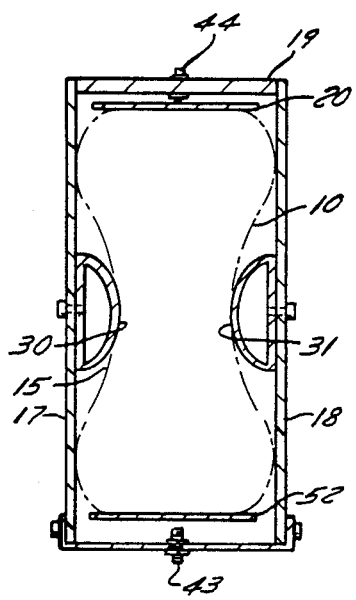
FIG. 3 is a sectional view taken on a line corresponding with 3—3 in FIG. 2.
Figure 2:
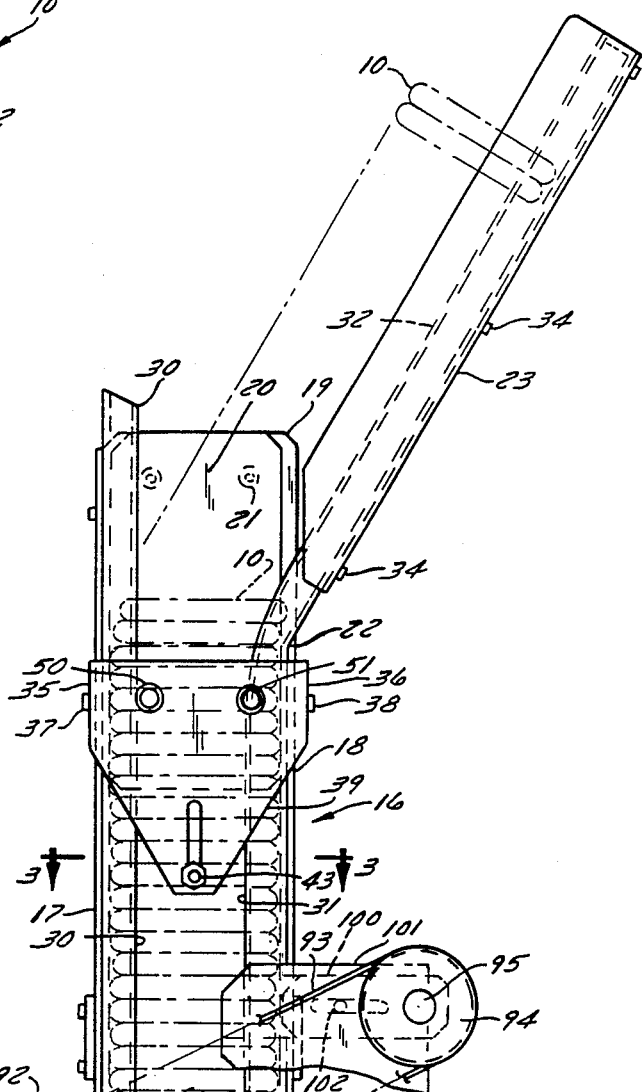
FIG. 2 is a front elevational view of a hopper and the new mechanism for discharging articles successively from the bottom of the stack of articles formed in the hopper.
Figure 2:
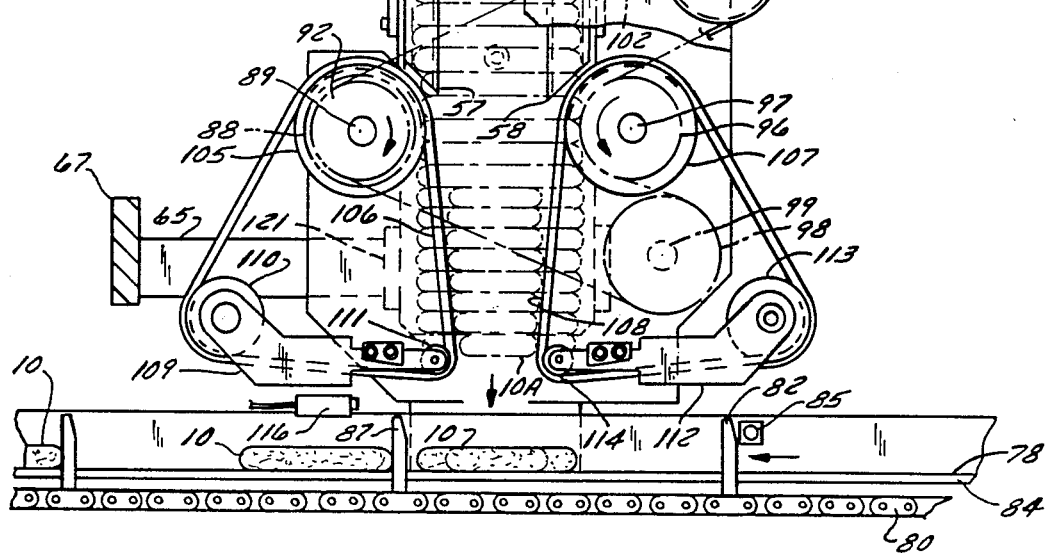

A front elevational view of the shape unstable feeder apparatus is shown in FIG. 2. The apparatus comprises a hopper which is designated generally by the reference numeral 16. The hopper has side walls 17 and 18. As shown in FIGS. 2 and 3 the hopper also has a rear wall 19. A vertically extending plate 20 is supported on adjustable thumb screws 21 which are threaded into the rear wall 19 of the hopper and make a swivel connection to the rear wall so the plate can be adjusted toward or away from the center of the hopper to accommodate pads of different sizes. The right side wall 18 in FIG. 2 terminates at a place marked 22 short of the rear wall 19 to thereby create an upper side opening in hopper 16 for input of pads 10 from a slanted open topped chute 23. The chute may be supplied with floppy pads 10 such as adult diapers from a diaper making machine, not shown. The chute is preferably slanted at an angle of about 30° to 45° from vertical so there is a larger gravitational force component through the flat faces of the pads than through their edges which inhibits the pliable pads from wrinkling or collapsing before they arrive in the vertical hopper wherein they stack flatly on each other and do not wrinkle.

Figure 4:
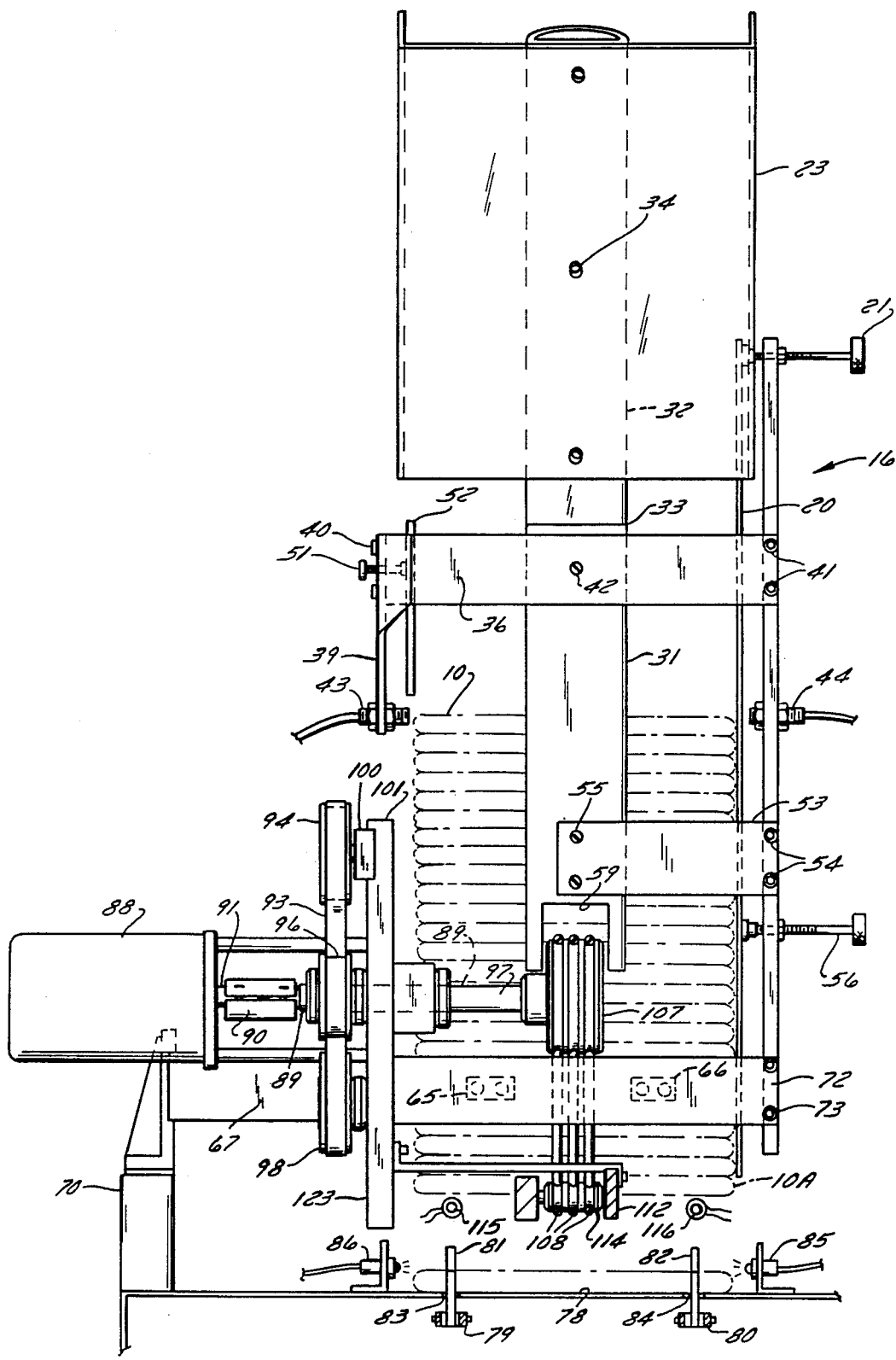
FIG. 4 is an elevational view taken on the right side of the apparatus in FIG. 2.

The hopper has two vertically extending guide members 30 and 31 which are substantially semicircular circular in cross-section. As shown in FIG. 3, the guide members extend into the contours 15 of the pads to stabilize the soft pads and assure that they stay level or horizontal as they descend in the hopper while individual pads are being withdrawn from the bottom of the stack. Guide member 31, as shown in FIG. 2, has an extension 32 which resides on the bottom of chute 23 and extends continuous with member 31 beyond a line 33 in FIG. 4 which marks where the guide member 31 is bent to form the extension. As shown in FIGS. 2 and 4, the chute 23 is supported on and fastened to guide member extension 32 by means of machine screws such as the one marked 34.

As shown in FIGS. 2 and 4, a pair of bar members 35 and 36 extend from the rear wall 19 of the hopper to which they are fastened by machine screws such as 37 and 38. A generally triangular plate 39 is fastened to the bar members 35 and 36 by machine screws such as the one marked 40 in FIG. 4. Machine screws 41 are typical for fastening the bar members to the rear wall member 19. As shown in FIG. 4, bar member 36 is tied into vertical guide member 31 with a machine screw 42 which contributes to stiffening the structure. Generally triangular plate 39 has a light source 43 mounted to it. The source projects a light beam toward a photosensor 44 which is mounted to rear wall 19. The positions of the light source and photosensor could be exchanged. This is an arrangement for detecting if the number of articles 10 in the hopper has decreased to below a desired number. When the stack of pads 10 is acceptably high in the hopper the light beam is obstructed and the electric output of photosensor 44 is at one state. When the top pad 10 in the stack is below the light beam the photosensor changes state and yields a different signal which can be utilized to indicate that the number of pads present in the hopper is too low.

There are adjustment screws 50 and 51 threaded into triangular plate 39. These screws make swivel connections to a short plate 52, shown in FIG. 4, which cooperates with the long adjustable vertical plate 20 to maintain the stack of diapers centered and stabilized in the hopper.

As shown in FIG. 4, a bar 53 is secured to rear wall member 19 by means of machine screws 54 and to the semicircular vertical guide member 31 by means of machine screws 55 to provide additional support for the guide member. An additional pair of adjusting screws 56 are provided for adjusting the position of guide plate 20 near its lower end.

As is evident in FIG. 2, the lower ends 57 and 58 of semicircular guide members 30 and 31 are beveled. As can be seen in FIG. 4, after pads 10 pass downwardly beyond the lower ends of the guide members 30 and 31 the pads are still guided on one end by the lower end of thin adjustable plate 20. The rear lower end of semicircular guide member 31 has a notch 59 in it for allowing entry of a grooved pulley 107 whose purpose will be discussed later.

The hopper is supported by bar members 65 and 66 which are fastened at one end to a bar 67 by means of machine screws 69 and 68, respectively. Bar 67 is connected into a machine frame bracket such as the one marked 70 by machine screws 71. The other ends of bar members 65 and 66 are joined to a cross member such as 72 by means of machine screws 73.

The new mechanism for dispensing one pad 10 at a time from the bottom of the stack of pads 10 will be discussed next. The depicted embodiment of the shape unstable article feeder is arranged for feeding pads 10 to a conveyor, in the illustrated embodiment, which runs well below the hopper and is mostly conventional. The elements of the conveyor can be visualized in FIGS. 2 and 4. It comprises a parallel pair of closed loop conveyor chains 79 and 80. A series of corresponding longitudinally equally spaced apart lugs 81 and 82 extend from chains 779 and 80 and through slots 83 and 84 in a table top 78. Whenever the aligned lug pairs 81 and 82 on opposite chains 79 and 80 interrupt the light beam which is projected from a light source 85 to a photosensor 86, the electric signal output of the photosensor changes state. The light source 85 and photosensor 86 are adjustable along the path of the conveyor to adjust for changes in dispensing timing through the full range of conveyor speeds. The aforementioned signal change is processed by known means and used to cause the lowermost pad 10A in the stack to be released for dropping on the conveyor between the lug 82 which was the last to interrupt the beam and the next downstream lug 87 by means of the new feed mechanism as will be explained in more detail later.

The new pad feeder mechanism will be described generally in reference to the front elevational view shown in FIG. 2 primarily but with some references to the FIG. 5 top plan view. In FIG. 2 the stepping motor 88 which effectuates incrementing articles 10A from the feeder is omitted for the sake of clarity. A shaft 89 which is coupled coaxially by means of a coupling 90 to the stepping motor shaft 91 is, however, shown in FIG. 2. Fastened to main drive shaft 89 in the foreground is a toothed pulley 92 which is rotated intermittently in the clockwise direction by the stepping motor 88 on command. Belt 93 runs over a toothed idler pulley 94 having a shaft 95. The belt 93 then runs on toothed pulley 96 on shaft 97 to turn this pulley counterclockwise when the belt translates. After traversing pulley 96, the belt runs on a toothed idler pulley 98 on shaft 99 from which the belt goes back to the motor driven pulley 92 to close the loop. Idler pulley 94 is mounted for rotation on an arm 100. The arm is clamped to a base plate 101 by a bolt 102 which provides for sliding arm 100 until the belt 93 has the proper tension and then tightening the clamping bolt 102.

Figure 5:
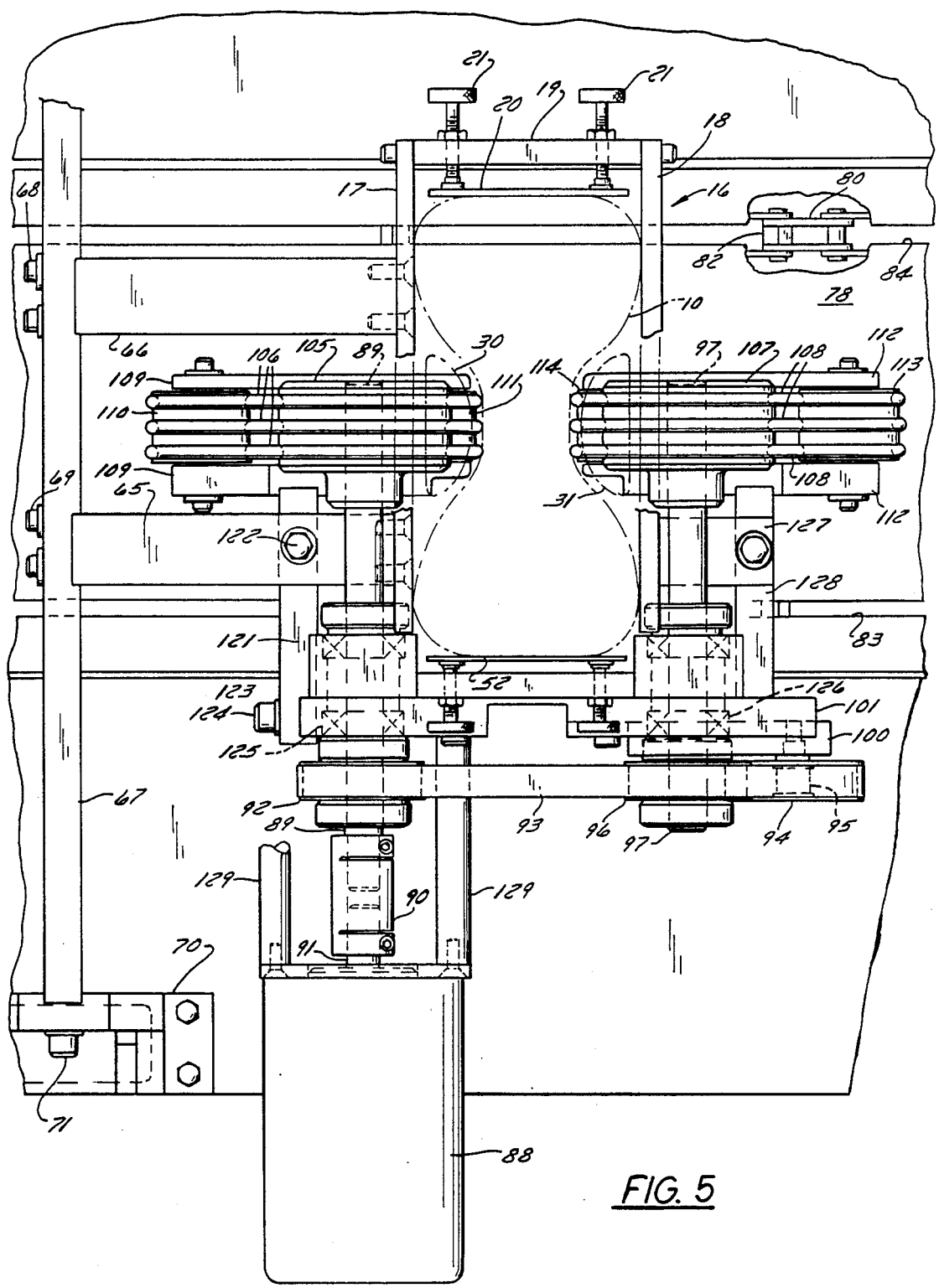
FIG. 5 is a plan view of the unstable article feeder.

As shown in FIGS. 2 and 5, a first pulley 105 having three peripheral belt grooves is mounted on an extension of shaft 89. Pulley 105 is behind toothed pulley 92. Three round cross-section belts 106 run on pulley 105. The belts on pulley 105 are close to the lower end 57 of semicircular article guide member 30 in the hopper. A second pulley 107 having three belt grooves is mounted on shaft 97 behind toothed pulley 96. Three round belts 108 run on pulley 107. The axes of oppositely rotating pulleys 105 and 107 are laterally spaced apart in a common horizontal plane and are symmetrical about a vertical central line through the hopper. As can be seen in FIG. 2, the points where the belts 106 make tangential contact with grooved pulley 105 and where the belts 108 make tangential contact with grooved pulley 107 are spaced apart by a distance greater than the width of the diaper pad 10 in the narrow central region 14. In other words, the points of tangency of the round belts on the pulleys 105 and 107 define the boundaries of the mouth of the downwardly converging passageway defined by the belts 106 and 108 which passageway is traversed by the pads at the bottom of the stack so that the lowermost pad 10A will be dispensed by the belts when the belts are driven translationally.

In FIG. 2, a bracket 109 has idler pulleys 110 and 111 journaled for rotation on it. The idler pulleys 110 and 111 are grooved and belts 106 run on them. An opposite bracket 112 has grooved idler pulleys 113 and 114 journaled for rotation on it. The smaller idler pulleys 111 and 114 are designated the third and fourth pulleys and they are symmetrical about a vertical central line passing through the hopper and are symmetrical to the points where the belts 106 and 108 are tangent to pulleys 111 and 114, respectively. The lower small pair of pulleys 111 and 114 are nearer to each other than the aforementioned points of tangency on said upper first and second grooves pulleys 105 and 107. Because the lower idler pulleys 111 and 114 are nearer to each other then the upper larger driven pulleys 105 and 107 the belts converge toward each other in the downward direction or, in other words, the belts define the boundaries of a v-shaped space. The space between the belts on the pulleys 111 and 114 constitute the exit from which pads are dispensed one-by-one or incrementally. Pulleys 111 and 114 are adjustable toward and away from each other to facilitate dispensing pads having various widths.

Some members which have not been mentioned before will be described primarily in reference to the FIG. 5 plan view. Support bar 65 has been mentioned. Its inner end ties into the hopper by means of screws. A longitudinally extending bar 121 is secured to bar 65 by a machine bolt 122 and to a cross plate 123 by means of bolts 124. Plate 123 is adapted for containing ball bearings such as the ones marked 125 and 126. Additional bars 127 and 128 tie into plate 123. Stepping motor 88 is supported on rods 129 mounted to plate 123.

The principles of the pliable article and pad feeder described herein can be advantageously applied to feed shape unstable articles of various configurations. In any case the articles of various configurations. In any case the articles must be dispensed at the proper time for them to land in a package or carton or land at the proper place on a moving conveyor, for instance. In the described version of the feeder, when the light beam from source 85 directed to photosensor 86 is interrupted by passing of lugs 81, 82 the concurrent change in the output signal of the photosensor is processed by means, not shown, to cause stepping motor 88 to start to run. When the stepping motor 88 turns on, round belts 106 and 108 translate together to cause a pad 10A to be dispensed. An instant after the pad 10A clears the belts in the space between lower idler pulleys 111 and 114 in FIG. 2, the dropping pad interferes with the light beams from combination light source and photosensor elements 115 and 116. The photosensors respond to the interference by changing their output signal level. This signal change is processed by means, not shown in such manner to bring about stopping of the stepping motor before another pad or other article is dispensed. Thus, for every motor turn on signal only one pad is dispensed.

In the arrangement of FIg. 2 thus far described pads 10 are dispensed at regular intervals to a conveyor as is most easily shown in FIGS. 2 and 4. The apparatus has other operating modes. In one application pads 10 such as diapers are fed onto the conveyor from the output of a diaper making machine, not shown. A folder and packaging machine, not shown, may be the destination of the pads. It is necessary to be sure that the pads are equally spaced apart and that there are no misses or gaps in the series of pads on the conveyor or a package may contain less than the specified number of pads. To avoid this problem the pad positions on the conveyor may pass across the beam from a light source such as source 85 in FIG. 4 which beam is directed toward photosensor 86. If pads are in correct positions on the conveyor the pads interrupt the beam at a predetermined periodicity and the stepping motor remains blocked. If one or more pads are missing in a series there will be no interruption of the beam by the empty pad positions. The response of the system in this case is to turn the stepping motor on and off as previously explained to dispense a pad into each empty position.

In another application of the feeder, not shown, when a signal change occurs such as due to interruption of a beam to a photosensor or due to operation of a switch, not shown, a controller which is also not shown causes a stepping motor to execute a predetermined number of cycles so that one after another of the articles are dispensed until a predetermined number of articles in a stack are formed or until a predetermined number are dropped into a carton, for example. Since the technology for causing stepping motors to increment is well known, it is considered unnecessary to show or discuss the control circuitry.

We claim:

1. A machine for feeding soft, pliable articles having an unstable shape, comprising:

a hopper having a top opening for input of said articles and a downwardly facing bottom opening for outflow of said articles, first and second similar pulley shaving a plurality of peripheral grooves and rotatable about parallel axes and laterally spaced apart by a predetermined distance in a common horizontal plane adjacent said bottom opening such that the space between said pulleys is in vertical alignment with said bottom opening, third and fourth similar pulleys having a plurality of peripheral grooves corresponding to the grooves in the first and second pulleys and rotatable about parallel axes lying in a common horizontal plane and laterally spaced apart by a distance less than said predetermined distance by which said first and second pulleys are spaced apart, the third and fourth pulleys being arranged below the first and second pulleys and the space between said third and fourth pulleys being substantially aligned with the space between the first and second pulleys, a first plurality of round belt means running over said first pulley in the respective grooves thereof and downwardly to over said third lower pulley in the respective grooves thereof and a second plurality of round belt means running over said second pulley in the respective grooves thereof and downwardly over said fourth lower pulley in the respective grooves thereof, said first and second plurality of belt means converging toward each other in the downward direction to define a generally v-shaped passageway into which articles from said hopper settle and at least the lowermost article is frictionally engaged directly between sides of the two pluralities of belt means between the lower third and fourth pulleys, motor means operatively coupled to said pulleys for driving said pulleys rotationally, and means for causing said motor means to run repeatedly to cause said belt means to translate by an amount sufficient to dispense only the lowermost article from between the lower pulleys under the frictional influence of the belts and then to stop running.

2. The machine for feeding articles according to claim 1 including:

a pair of shaft means journaled for rotation, said first pulley being fastened on one of said shaft means and said second pulley being fastened on the other of said shaft means, a toothed pulley fastened on each of said shaft means, said stepping motor having a power output shaft and a toothed pulley fastened to said shaft, and a toothed belt engaged with and running on said pulleys.

3. The machine for feeding articles according to claim 1 wherein:

said hopper has a vertically extending wall member and there is a guide plate arranged generally parallel to the wall member and means for adjusting said guide plate toward and away from said wall member such that when said articles descend through said hopper in contact with said guide plate the articles will be maintained in a straight stack by the guide plate.

4. A machine for feeding articles having an unstable shape, comprising:

a hopper having a top opening for input of said articles and a downwardly facing bottom opening for outflow of said articles, first and second similar pulleys rotatable about parallel axes and laterally spaced apart by a predetermined distance in a common horizontal plane adjacent said bottom opening such that the space between said pulleys is in vertical alignment with said bottom opening, third and fourth similar pulleys rotatable about parallel axes lying in a common horizontal plane and laterally spaced apart by a distance less than said predetermined distance by which said first and second pulleys are spaced apart, the third and fourth pulleys being arranged below the first and second pulleys and the space between said third and fourth pulleys being substantially aligned with the space between the first and second pulleys, first belt means running over said first pulley and downwardly to over said third lower pulley and second belt means running over said second pulley and downwardly over said fourth lower pulley, said first and second belt means converging toward each other in the downward direction to define a generally v-shaped passageway into which articles from said hopper settle and at least the lowermost article is frictionally engaged between sides of the two belt means between the lower third and fourth pulleys, motor means operatively coupled to said pulleys for driving said pulleys rotationally, and means for causing said motor to run and stop to cause said belt means to translate and dispense the lowermost article from between the lower pulleys under the frictional influence of the belts, elongated vertically extending guide members mounted in spaced apart and generally parallel relationship in said hopper for a stack of said articles to fit between said guide members, an upper portion of one of said vertically extending guide members being at an acute angle with respect to vertical, and a chuted mounted to said one guide member for directing said articles into said hopper.

5. A machine for feeding articles having an unstable shape, comprising:

a hopper having a top opening for input of said articles and a downwardly facing bottom opening for outflow of said articles, first and second similar pulleys rotatable about parallel axes and laterally spaced apart by a predetermined distance in a common horizontal plane adjacent said bottom opening such that the space between said pulleys is in vertical alignment with said bottom opening, third and fourth similar pulleys rotatable about parallel axes lying in a common horizontal plane and laterally spaced apart by a distance less than said predetermined distance by which said first and second pulleys are spaced apart, the third and fourth pulleys being arranged below the first and second pulleys and the space between said third and fourth pulleys being substantially aligned with the space between the first and second pulleys, first belt means running over said first pulley and downwardly to over said third lower pulley and second belt means running over said second pulley and downwardly over said fourth lower pulley, said first and second belt means converging toward each other in the downward direction to define a generally v-shaped passageway into which articles from said hopper settle and at least the lowermost article is frictionally engaged between sides of the two belt means between the lower third and fourth pulleys, motor means operatively coupled to said pulleys for driving said pulleys rotationally, and means for causing said motor to run and stop to cause said belt means to translate and dispense the lowermost article from between the lower pulleys under the frictional influence of the belts, including means for starting said motor means at the time an article should be dispensed and photosensor means for detecting the presence of said article shortly after said article has been dispensed and is dropping under the influence of gravity and for producing a corresponding signal for causing said motor means to be deenergized and to stop.

6. The machine according to claim 1 wherein said motor comprises a stepping motor.

* * * * *